(12) United States Patent
Smith

(10) Patent No.: US 6,634,835 B1
(45) Date of Patent: Oct. 21, 2003

(54) CUTTER BLADE WITH INTEGRAL COOLANT PASSAGES

(75) Inventor: Todd A Smith, Fort Wayne, IN (US)

(73) Assignee: Torque-Traction Technologies Inc., Holland, OH (US)

(*) Notice: Subject to any disclaimer, the term of this patent is extended or adjusted under 35 U.S.C. 154(b) by 0 days.

(21) Appl. No.: 09/883,960

(22) Filed: Jun. 20, 2001

(51) Int. Cl.⁷ .............................. B23P 15/28; B23F 21/12
(52) U.S. Cl. ............................................. 407/11; 407/21
(58) Field of Search ................................. 407/11, 23, 24, 407/25, 22, 21; 409/11, 12, 13, 14, 15, 16, 17, 18, 19, 20, 21, 22, 23, 24, 33, 34, 35, 36, 37; 76/115

(56) References Cited

U.S. PATENT DOCUMENTS

| | | | |
|---|---|---|---|
| 2,848,790 A | | 8/1958 | McMann |
| 3,077,802 A | | 2/1963 | Philip |
| 4,072,438 A | | 2/1978 | Powers |
| 5,288,179 A | * | 2/1994 | Cuypers et al. ............... 407/20 |
| 5,290,135 A | * | 3/1994 | Ball et al. ..................... 407/11 |
| 5,775,854 A | | 7/1998 | Wertheim |
| 5,829,331 A | | 11/1998 | Mori |
| 5,829,926 A | | 11/1998 | Kammermeier |
| 6,053,669 A | | 4/2000 | Lagerberg |

* cited by examiner

Primary Examiner—Jacob K. Ackun
(74) Attorney, Agent, or Firm—Liniak, Berenato & White

(57) ABSTRACT

A hob type cutter blade for use in a hobbing process. The cutter blade is formed with at least one cooling passage that permits the flow of coolant through the cutter blade to the contact surface reducing the heat generation as well as dissipating any heat already produced during the hobbing operation. During manufacturing, the cooling passage is sintered into the carbide cutter blade without the addition of separate operation.

12 Claims, 2 Drawing Sheets

CUTTER BLADE WITH INTEGRAL COOLANT PASSAGES

BACKGROUND OF THE INVENTION

1. Field of the Invention

The present invention relates generally to a cutting blade and the method for producing cutting blades. More particularly, a blade and a method for producing cutting blades which may be used to face hob spiral bevel, zerol, and hypoid gears, wherein the cutter blade contains a cooling passage to continuously cool the contact surface.

2. Description of Related Art

Spiral bevel, zerol and hypoid gears are well known and widely used throughout the automotive industry in a variety of drivetrain applications. Conventional methods for making each of these gears include face milling and face hobbing, with the two methods producing different gear tooth geometry which must be taken into consideration during the gear design. Gears produced by face milling typically have a tapered tooth depth, with the heel end of the tooth being deeper than the toe end of the tooth but they may also have uniform depth teeth. In contrast, gears produced by face hobbing always exhibit a uniform tooth depth. Face milling is an intermittent indexing process which cuts one tooth at a time and then indexes to the next slot so as to cut the adjacent tooth. This process is repeated until all of the teeth have been cut. Face milling is referred to as a two-axis system since the work, or gear, is required to rotate in a timed relationship with a cradle mechanism used to mount a cutter head assembly. In contrast, face hobbing is a continuous indexing process whereby all of the gear teeth are cut simultaneously. Face hobbing is considered a three-axis process since the rotation of the gear, cradle, and cutter head assembly are all in a timed relationship with one another. Face milling is an older process, with face hobbing becoming more important with the advent of computer numerical controlled machines which allows the user to produce either geometry. Customer requirements, engineering and production requirements are considered when selecting either face milling or face hobbing to produce a gear.

Each of the cutting methods utilizes a plurality of cutting blades which are mounted into slots, being typically four-sided and formed in a face of a cutter head. The cutter head is typically a two-piece construction comprising a first, disk-like member and a second, backing ring member which is concentric with the disk. In a known device, portions of each of the blade-receiving slots are formed in both the disk and the backing ring. The two members are sized such that they mate together in an interference fit and known cooling and heating techniques are utilized to assemble the parts. For instance, the disk may be cooled, so as to shrink or reduce its outer diameter, and the concentric backing ring member may be heated so as to increase its inner diameter. After assembly, the two parts may be welded or bored together. This method of assembling the concentric members of the cutter head is known to cause thermal distortion in the slots which receive the individual cutting blades. The slots typically include a radially inward blade seating surface, parallel sidewalls, and a radially outward surface. Known two-axis face milling, tapered depth style cutter heads are normally trued for variations in the radial location of the blade seating surface. This is typically accomplished using shim stock, known as parallels, or by using a system of adjusting wedges, which correct for discrepancies in radial location of the seating surface as small as $1/10,000$th of an inch due to the very high accuracy that is required in manufacturing the aforementioned gears. Either the parallels or the adjusting wedges are positioned between the blade seating surface in the cutter head slots and the individual cutting blades so as to provide a method to correct radial position of the blades. Known face mill cutter heads may also be trued for pressure angle variations in the cutter blades using correction wedges to adjust the blade pressure angle.

During the machining process for metal operations, heat builds up between the contact surface of the metal being machined and the blades. This heat facilitates the rapid breakdown of the blades. In metal working operations, coolant is commonly applied to the contact point or area of the tool and workpiece in order to extend the life of the cutting blades. The coolant prevents overheating by absorbing heat due to the working operation and also lubricates the contact area to reduce friction therefore reducing the amount of heat generated by frictional contact of the tool and workpiece. In stock removing processes, coolant further serves to flush metal chips away from the contact area.

In the tools where a plurality of stock removing surfaces, such as cutting blades, are arranged about the face of a tool body or head, it has been conventional to supply coolant to the contact area by spraying. It is known to provide a spraying coolant from the central attachment screw of a milling tool onto the stock removing surfaces of the tool. It is also well known to spray coolant onto a tool and workpiece via one or more externally arranged coolant hoses having their outlets located near the contact area. In spraying, however, delivery of coolant originates from outside of the contact area and does not always adequately supply the tool and workpiece with sufficient coolant.

The prior art shows a rotary ring cutter having cooling passages located within the cutter to supply coolant to discharge outlets located on or between the workpiece and the ring cutter. Another example of the prior art is a carbide drill shaft that contains helically extending ducts for transporting cooling liquid. However, cutter blades used in the hobbing process lack any such cooling means as provided in the prior art.

The need therefore exists for a hob type cutter blade with the capability of supplying coolant directly to the point of contact of the blade and the workpiece.

There exists a further need to manufacture such a hob type cutter without the addition of a further operation.

SUMMARY OF THE INVENTION

It is therefore an advantage of the present invention to provide a cooling passage within a hob type cutter blade. The cooling passage permits the flow of coolant through the cutter blade to the contact surface reducing the heat generation as well as dissipating any heat already produced during the hobbing operation. The cooling passage is sintered into the carbide cutter blade without the addition of separate operation during manufacturing.

These advantages and other novel features of the present invention will become apparent in the following detailed description of the invention when considered in conjunction with the accompanying drawings.

BRIEF DESCRIPTIONS OF THE DRAWINGS

A better understanding of the present invention will be had when reference is made to the accompanying drawings, wherein identical parts are identified by identical reference numbers and wherein.

DETAILED DESCRIPTION OF THE PRESENT INVENTION

Figure 1:
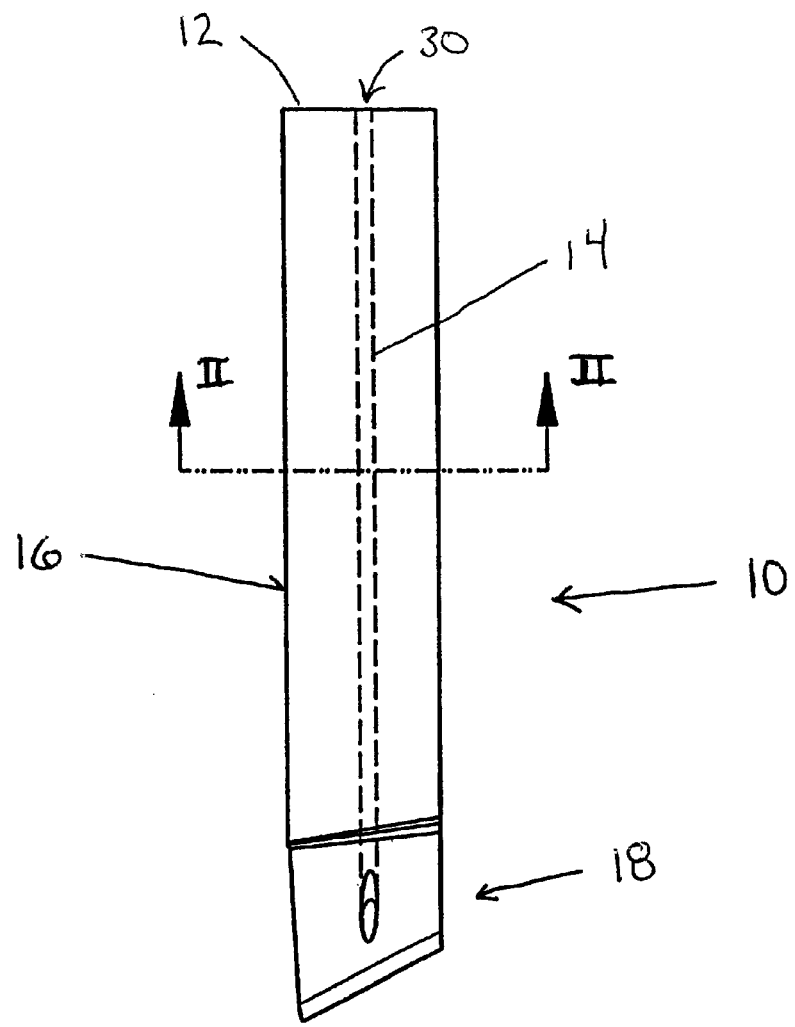
FIG. 1 is a side profile view of the present invention.

Referring to FIG. 1, there is illustrated a cutter blade 10 in accordance with the present invention. The cutter blade 10 includes a shank 16 and a cutting member 18 at one end thereof. A plurality of the cutter blades 10 is mounted on a rotatable, circular cutter head (not shown) as part of a face hobbing system. During the face hobbing process, the gear member (not shown) and cutter head continuously rotate, with successive cutter blades engaging successive tooth slots as the gear member is being cut. The tip relief cutter blade of the present invention is equally applicable to the face hobbing of bevel gears or the pinion member of a gear set.

Figure 2:
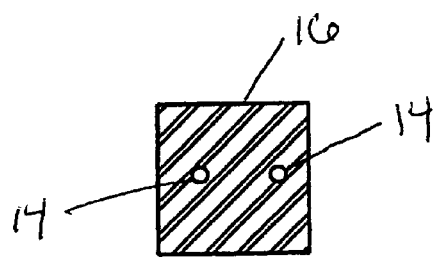
FIG. 2 is a cross sectional view of the present invention taken along the line II—II.
Figure 4:
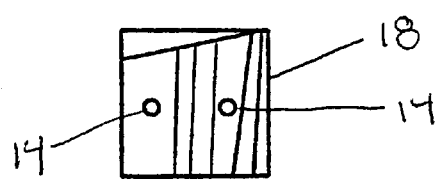
FIG. 4 is a view of the cutting face of the present invention.

Face hobbing cutting systems generally utilize cutter blades which are profile relief ground at the end user's facility from uniform blanks to afford a variety of specified configurations. The hob type cutter blade 10 has a plurality hollow cavities, known as coolant passages 14, sintered into the carbide cutter blade beginning at the back, or non-cutting, end 12 continuing through the entire length of the shank 16 and exiting on the cutting face 18. However, while the preferred embodiment of the cutter blade utilizes is constructed from carbide, the cutter blade may be made from any suitable material as is known in the art, e.g., carbide, steel, ceramic, etc. As seen in FIGS. 2 and 4, the passages 14 are continuous to allow the flow of a cooling liquid 30 during hobbing operations.

Figure 3:
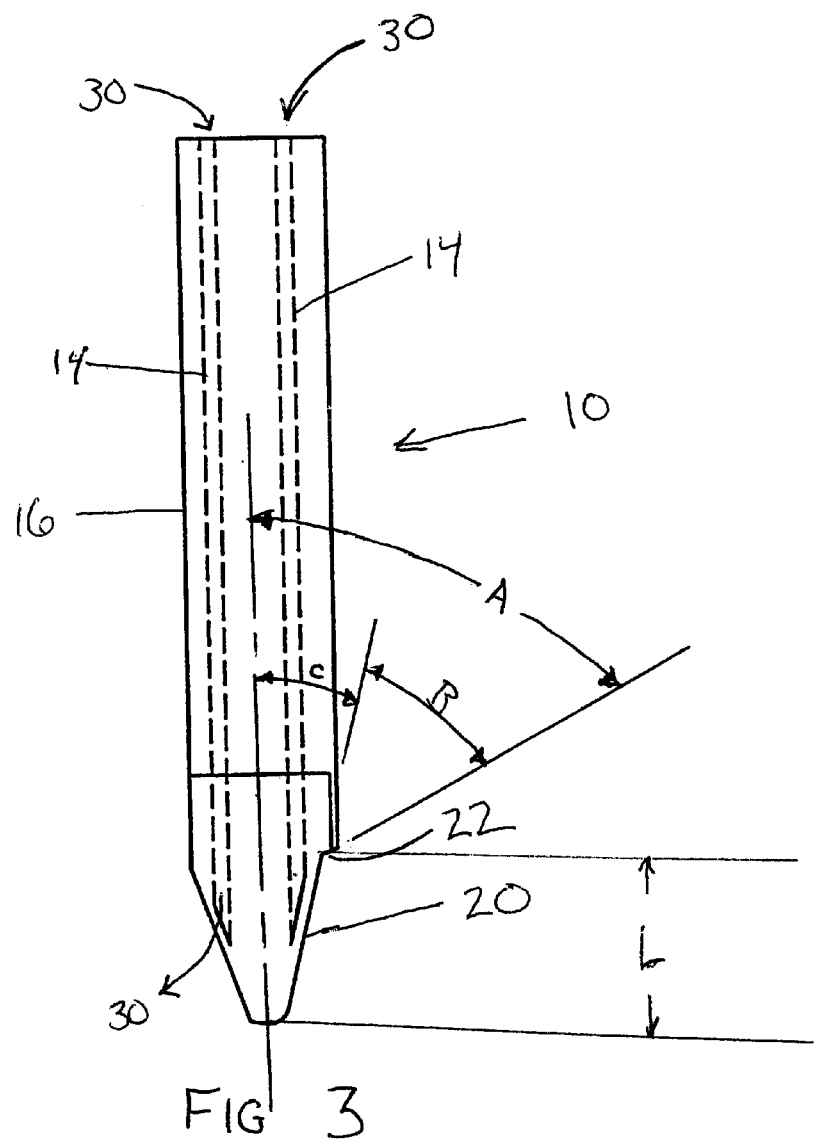
FIG. 3 is a front profile view of the present invention.

The front face of the cutting member 18 of each cutter blade 10 is provided, generally on only one side thereof, with a cutting edge 20 extending from the tip of the cutting member 18 at a predetermined axial pressure angle, as shown in FIG. 3. The axial pressure angle of the cutting edge 20 obviously depends on the angle desired for the sides of the gear teeth. As used herein, "axial pressure angle" is defined as the angle between the blade edge (or tooth profile) and the axis of the cutter blade 10. The cutter blades 10 are generally mounted on the cutter head in groups. For instance, in the systems offered by The Gleason Works, the cutter blades are arranged on the cutter head in groups of two, each cutter blade pair operating on a different tooth space. In other systems, the cutter blades may be arranged on the cutter head in groups of three. In such systems, there is an inner, outer and rougher blade which operate to cut the sides and bottom of each tooth space, respectively. The rougher cutter blade (not shown) is generally provided with both inner and outer cutting edges.

By modifying the specified blade grinding parameters for forming the cutter blade 10 from a blank, the blade configuration can be altered to incorporate a relief edge 22 having a predetermined axial pressure angle A, which is greater than the axial pressure angle B of the tooth cutting edge 20 by some predetermined amount, as best seen in FIG. 3. Thus, the cutter blade 10 cuts the side of the gear tooth by means of the cutting edge 20, and simultaneously forms a relief on the tip of the gear tooth by means of the relief edge 22. The blade angle modification is defined by a length increment L and an angle deviation C. The length increment L is the distance from the tip of the cutting member 18 to the intersection of the cutting edge 20 and the relief edge 22. The angle deviation C is the angle between the face of the cutting edge 20 and the face of the relief edge 22. The specific dimensions of the blade angle modification are dependent on the depth of the part to be produced, the amount of angle deviation C desired, and the length increment L. The length increment L and angle deviation C may be varied and optimized experimentally during the development of a specific gear set to produce the desired tip relief. Depending upon the thickness of the blank used to produce the cutter blade, it may not be possible to produce cutter blades having certain combinations of cutting edge axial pressure angle B, length increment L, and angle deviation C, as the relief edge axial pressure angle A may in some configurations project outside of the available blade thickness.

The blade angle deviation C may be very small and still provide a beneficial degree of noise reduction during operation of the gear set. In addition, it is not necessary that the relief edge 22 be straight. The relief edge 22 may comprise a concave portion extending from the end of the cutting edge 20 to the outer edge of the cutter blade shank 14.

The cutter blades 10 of the present invention are secured to the circular cutter head in the conventional manner, and the face hobbing system is operated in the same manner as if conventional cutter blades were employed. Should the cutter blade layout consist of two blades per group, at least one cutter blade 10 in each pair (either all of the inner blades or all of the outer blades) is provided with a relief edge 22 adapted to form a relief on one side of the tip of each tooth. Preferably, each cutter blade is provided with a relief edge, so that a relief is formed on both sides of the tip of each tooth. Where the blade layout consists of three cutter blades per group, the rougher blade may be provided with a relief edge on its inner edge, its outer edge or, preferably, on both of its edges. Alternatively, a relief edge may be provided on the cutting edge of the inner cutter blade, the outer cutter blade or, preferably, on both the inner and outer cutter blades.

A seal is placed between the operating machine (not shown) and cutter head 18 to allow coolant to pass through the holes in the cutter blade from the back end 12 of the cutter blade 10 and exit at the contact surface between the cutting edge 20 and the metal from which the bevel gear is to be formed. The coolant passages limits the heat generated between the cutting edge 20 and the metal. In addition to limiting the heat generation, the coolant also dissipates heat already present during the hobbing operation. Thus the service life of hob type cutter blades is extended beyond that presently in the marketplace.

Present manufacturing techniques allow for the sintering to occur in a single operation. The elimination of a subsequent manufacturing operation improves the consistency of the relief and part quality, as well as reducing the overall manufacturing costs associated with such an improvement.

As will be appreciated by those skilled in the art, use of the hob type cutter blade 10 with coolant passages of the present invention would not be beneficial in a conventional face milling operation which produces teeth of tapered depth, since a tip relief of uneven width along the length of the tooth would result.

In accordance with the provisions of the patent statutes, the present invention has been described in what is considered to represent its preferred embodiment. However, it should be noted that the invention can be practiced otherwise than as specifically illustrated and described without departing from its spirit or scope. For example, while the preferred embodiment above illustrates a hob type cutter blade with two coolant passages, any number of passages may be used in other embodiments, e.g., 1, 3, 4, and so on. And as previously mentioned, the cutter blade may be made from carbide, stell, ceramic, or any other suitable material.

What is claimed is:

1. A hob type cutter blade, comprising:

a shank;

said shank having a back end and a cutting edge;

said cutting edge of said shank comprising a plurality of cutting faces for cutting into an object during a hobbing process; and said shank comprising at least one passage being configured in an axial direction of said shank and disposed to permit coolant to be transported along at least a substantial portion of said shank and toward from said cutting edge.

2. The hob type cutter blade according to claim 1, wherein said at least one passage is formed into said shank through sintering.

3. The hob type cutter blade according to claim 1, wherein said at least one passage is formed into said shank through drilling.

4. The hob type cutter blade according to claim 1, wherein said at least one passage extends through an entire length of said back end and opens at a surface adjacent said cutting edge.

5. The hob type cutter blade according to claim 1, wherein said at least one passage comprises a pair of parallely extending passages.

6. The hob type cutter blade according to claim 1, wherein said back end being rectangular in cross-section.

7. A method of manufacturing a hob type cutter blade, comprising the steps of:

cutting a shank from a carbide metal;

forming a back end and a cutting edge of said shank;

honing a plurality of cutting faces on said shank for use in a hobbing process; and creating at least one passage into said shank configured in an axial direction of said shank and disposed to permit coolant to be transported along at least a substantial portion of said shank and toward from said cutting edge.

8. The method of claim 7, wherein creating at least one passage is formed through sintering.

9. The method of claim 7, wherein creating at least one passage is formed through drilling.

10. The method of claim 7, wherein said at least one passage extends through an entire length of said back end and opens at a surface adjacent said cutting edge.

11. The method of claim 7, wherein said at least one passage comprises a pair of parallely extending passages.

12. The method of claim 7, wherein said back end being rectangular in cross-section.

\* \* \* \* \*